(12) United States Patent
Fujisaki et al.

(10) Patent No.: US 8,023,643 B2
(45) Date of Patent: Sep. 20, 2011

(54) ENCRYPTION/DECRYPTION APPARATUS

(75) Inventors: Koichi Fujisaki, Kanagawa-ken (JP);
Hideo Shimizu, Kanagawa-ken (JP);
Atsushi Shimbo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1183 days.

(21) Appl. No.: 11/511,401

(22) Filed: Aug. 29, 2006

(65) Prior Publication Data
US 2007/0071235 A1    Mar. 29, 2007

(30) Foreign Application Priority Data

Sep. 29, 2005 (JP) ............................... P2005-285596

(51) Int. Cl.
*H04L 9/22* (2006.01)
(52) U.S. Cl. .......................................... 380/1; 380/268
(58) Field of Classification Search ................. 380/1
See application file for complete search history.

(56) References Cited

U.S. PATENT DOCUMENTS

| | | | | |
|---|---|---|---|---|
| 5,237,615 A | * | 8/1993 | Snow | 380/47 |
| 6,295,606 B1 | * | 9/2001 | Messerges et al. | 713/189 |
| 6,466,669 B1 | * | 10/2002 | Matsui et al. | 380/37 |
| 7,426,629 B2 | | 9/2008 | Piry et al. | 712/225 |
| 2003/0048903 A1 | * | 3/2003 | Ito et al. | 380/263 |
| 2004/0025032 A1 | * | 2/2004 | Chow et al. | 713/189 |
| 2007/0160196 A1 | * | 7/2007 | Timmermans | 380/28 |

FOREIGN PATENT DOCUMENTS

| | | |
|---|---|---|
| JP | 2001-282650 | 10/2001 |
| JP | 2002-366029 | 12/2002 |
| JP | 2003-122708 | 4/2003 |
| JP | 2003-134103 | 5/2003 |

OTHER PUBLICATIONS

Gandolfi, et al., "Electromagnetic Analysis: Concrete Results", CHES, pp. 251-261, (2001).

* cited by examiner

*Primary Examiner* — David Pearson
(74) *Attorney, Agent, or Firm* — Finnegan, Henderson, Farabow, Garrett & Dunner, L.L.P.

(57) ABSTRACT

A first Exclusive OR circuit operates an Exclusive OR between input data and a predetermined random number. An operation circuit performs one operation of encryption and decryption of output data from the first Exclusive OR circuit. A data register circuit, which has a plurality of data hold units, holds data from the operation circuit in one data hold unit of the plurality of data hold units in response to a selection signal, and supplies the data from the one data hold unit to the operation circuit. A second Exclusive OR circuit performs an Exclusive OR between output data from the data register circuit and the random number. The operation circuit recursively performs the one operation of the data from the data register circuit and outputs next data to the data register circuit.

19 Claims, 4 Drawing Sheets

ENCRYPTION/DECRYPTION APPARATUS

CROSS-REFERENCE TO RELATED APPLICATIONS

This application is based upon and claims the benefit of priority from prior Japanese Patent Application No. 2005-285596, filed on Sep. 29, 2005; the entire contents of which are incorporated herein by reference.

FIELD OF THE INVENTION

The present invention relates to an apparatus for encrypting/decrypting data by repeatedly executing the same operation processing.

BACKGROUND OF THE INVENTION

In general, in a block cipher algorithm such as the DES method determined by FIPS46-3 (FIPS: Federal Information Processing Standard), data is encrypted/decrypted by repeating a predetermined operation processing a predetermined number of times. Concretely, whenever the operation processing is executed, an operation result is temporarily stored in a memory means (Ex. Register). The next operation processing is executed using the current operation result, and the next operation result is overwritten in the memory means. Briefly, encryption/decryption is executed while updating the operation processing stored in the memory means.

Aim at data change in the memory means is explained. Hamming distance is represented as a difference between two operation results continued on a time axis. If there is correlation between Hamming distance and power consumption, then an attacker reveals secret information in an encryption/decryption apparatus. And one method for estimating secret information in the encryption/decryption apparatus is the DPA (Differential Power Analysis), which using analysis data for transition of change of power consumption and data.

By using the DPA, if a change of the power consumption of a circuit (having encryption function) or a processor (executing encryption operation) relates to secret data during operation, the secret data can be disclosed. The DPA is an attack without a destroy package. By watching an outside of a chip (or a device), it is not decided whether key information is extracted with the attack or not, and it is feared that damage by unauthorized use expands. Accordingly, in the circuit for encryption, protection against a DPA attack is necessary.

One of a countermeasure for the DPA is the data mask method for hiding any correlation between the power consumption and the operation data from an attacker. For example, the data mask method is disclosed in "An implementation of DES and AES, secure against some attacks", Proceedings of CHES 2001, LNCS 2162, pp. 309-318, 2001.

In the data mask method, a random number is used as data for masking. By performing Exclusive OR between data for operation and data for masking, the data for operation is masked. Briefly, by masking data with the random number during operation, the attacker cannot correctly estimate the data on operation. As a result, secret information in the encryption module cannot be disclosed.

In case of executing the DPA protection by the data mask method, it is desired that a random number of necessary quantity is always obtained. However, if constraint of the power consumption and a circuit scale is strict such as an IC card, output data width of a random number generation circuit need be miniaturized.

In this case, in order to obtain the random number for masking from the random number generation circuit, several clocks are necessary. Furthermore, by relationship between an output data width of the random number generation circuit and a data width for masking, operation processing often waits several clock periods. Briefly, during processing of encryption/decryption, wait time for generation of random number occurs at each operation.

Accordingly, in each timing of encryption/decryption, operation data is masked with the same random number by Exclusive OR. Hereinafter, "masking" means Exclusive OR between data for masking and data for operation.

In case of writing two continuous masked data (Masked Data A and Masked Data B) into the memory means, Hamming distance of data is explained. As for the Masked Data a firstly written into the memory means, Data A being on operation is masked by data ("RN") for masking. As for the Masked Data B secondly written into the memory means, Data B being on operation is masked by data ("RN") for masking.

The Hamming distance of data in the memory means is the same as the operation result of Exclusive OR of two written data. Accordingly, the Hamming distance is represented as follows.

The Hamming distance of data=Masked Data $A$^Masked Data $B$=(Data $A$^$RN$) ^(Data $B$^$RN$) =Data $A$^Data $B$^$RN$^$RN$=Data $A$^Data $B$ In this way, data for masking ("RN") is eliminated. This corresponds to the change quantity of two continuous data in the memory means. Therefore if an attacker can correctly estimate the change quantity (Hamming distance) in the memory means, secret information can be disclosed and safety cannot be guaranteed. (Analysis model aiming at Hamming distance of two continuous data is called a state transition model.)

SUMMARY OF THE INVENTION

The present invention is directed to an encryption/decryption apparatus with enhanced security against a DPA attack while suppressing increase of a number of transistors in circuit.

According to an aspect of the present invention, there is provided an encryption/decryption apparatus comprising: a random number supply unit configured to supply a random number; a first Exclusive OR circuit configured to perform an Exclusive OR between input data and the random number; an operation circuit configured to perform one operation of encryption and decryption of output data from the first Exclusive OR circuit; a data register circuit having a plurality of data hold units, configured to hold data from the operation circuit in one data hold unit of the plurality of data hold units in response to a selection signal, and to supply the data from the one data hold unit to the operation circuit; and a second Exclusive OR circuit configured to perform an Exclusive OR between output data from the data register circuit and the random number; wherein the operation circuit recursively performs the one operation of the data from the data register circuit and outputs next data to the data register circuit.

According to another aspect of the present invention, there is also provided an encryption/decryption apparatus comprising: an operation circuit configured to perform one operation of encryption and decryption of input data; a data register circuit having a plurality of data hold units, configured to hold data from the operation circuit in one data hold unit of the plurality of data hold units in response to a selection signal, and to supply the data from the one data hold unit to the operation circuit; wherein the operation circuit recursively performs the one operation of the data from the data register circuit and outputs next data to the data register circuit.

DETAILED DESCRIPTION OF THE EMBODIMENTS

Figure 1:
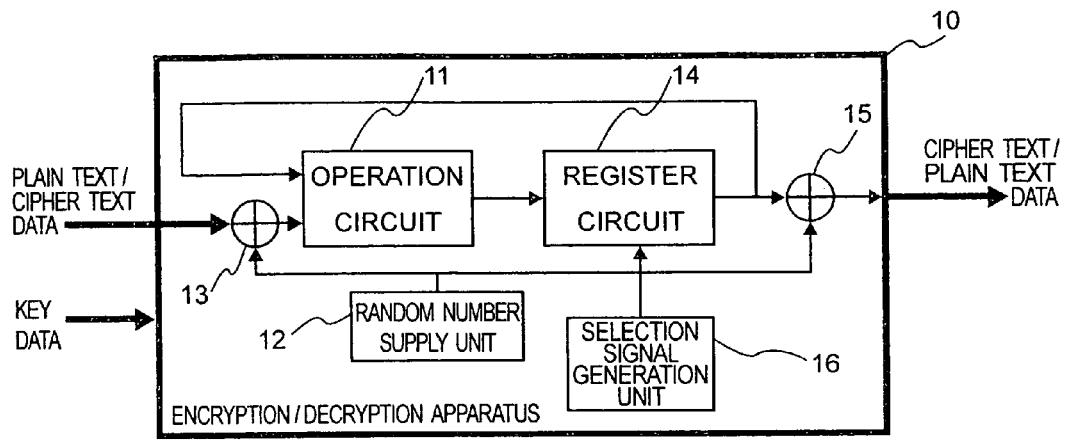
FIG. 1 is a block diagram of encryption/decryption apparatus according to one embodiment.

Hereinafter, various embodiments of the present invention will be explained by referring to the drawings. The present invention is not limited to the following embodiments.

FIG. 1 is a block diagram of an encryption/decryption apparatus according to one embodiment. The encryption/decryption apparatus 10 may be any of an encryption apparatus for encrypting plain text data and generating cipher text data, a decryption apparatus for decrypting cipher text data and generating plain text data, and an encryption/decryption apparatus having both functions. Furthermore, the encryption/decryption apparatus 10 is based on an encryption/decryption algorithm for repeatedly executing the same operation processing.

In the encryption/decryption apparatus 10, plain text/cipher text data and key data each having a predetermined length are input, and cipher text/decipher (plain) text data of predetermined length is output. A data length of plain text/cipher text data and a data length of key data are determined by the encryption/decryption algorithm.

The encryption/decryption apparatus 10 includes an operation circuit 11, a random number supply unit 12, Exclusive OR circuits 13 and 15, a register circuit 14, and a selection signal generation unit 16.

The operation circuit 11 executes a predetermined operation (based on the encryption/decryption method) with input data, and outputs the operation result as output data. At start time of encryption/decryption, plain text/cipher text data from the outside is regarded as input data. At each time after the start time, output data (previous operation result) from the operation circuit 11 is regarded as input data. Furthermore, operation of the operation circuit 11 is affected by the key data.

The random number supply unit 12 constantly supplies the same random number in one processing period of encryption/decryption (a period from input time of plain text/cipher text data to output time of cipher text/plain text data).

Figure 2:
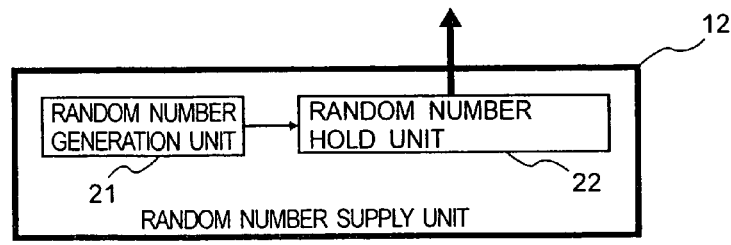
FIG. 2 is a block diagram of a random number supply unit 12 in FIG. 1.

FIG. 2 is a block diagram of one example of the random number supply unit 12. A random number generation unit 21 generates a random number. A length of the random number generated by the random number generation unit 21 per one time is shorter than a length of input data to input to the encryption/decryption apparatus 10. For example, the random number generation unit 21 generates a random number of eight bits per one time, and repeatedly generates the random number until a length of random numbers generated is equal to a length of the input data. The random number generation unit 21 which generates a random number of short lengths per one time can be realized with a small package scale.

A random number hold unit 22 can hold data having the same length as the plain text/cipher text data to be input to the encryption/decryption apparatus 10. Concretely, the random number hold unit 22 serially connects each random number generated from the random number generation unit 21 until a length of connected random numbers is equal to a length of the plain text/cipher text data, and constantly outputs the (connected) random number having the equal length.

In the random number supply unit 12, it takes time to prepare the random number to be supplied. However, the random number supply unit 12 can be miniaturized, which is useful for the IC card.

In FIG. 1, the Exclusive OR circuit 13 operates Exclusive OR between input data (plain text/cipher text data) and a random number from the random number supply unit 12. Briefly, the Exclusive OR circuit 13 masks input data to be supplied to the operation circuit 11. Hereinafter, output from the Exclusive OR circuit 13 is called masked data.

The register circuit 14 temporarily holds masked data operated from the operation circuit 11, and supplies the masked data as next input data to the operation circuit 11. Furthermore, the selection signal generation unit 16 generates a selection signal to the register circuit 14. Detail of the register circuit 14 and the selection signal generation unit 16 are explained afterwards.

The Exclusive OR circuit 15 operates Exclusive OR between masked data from the register circuit 14 and the random number from the random number supply unit 12 by each bit. The Exclusive OR has characteristic that some data returns to original data by executing the same Exclusive OR two times. For example, input data to the encryption/decryption apparatus 10 is masked with the random number (from the random number supply unit 12) by the Exclusive OR circuit 13, and masked data is input to the operation circuit 11. Operation result of the masked data from the operation circuit 11 is supplied to the Exclusive OR circuit 15 through the register circuit 14. Last, the Exclusive OR circuit 15 operates Exclusive OR between an operation result of masked data and the same random number (from the random number supply unit 12). As a result, the operation result of masked data returns to an operation result of original data. Briefly, masked data exists between the Exclusive OR circuit 13 and the Exclusive OR circuit 15. In this case, the random number supply unit 12 supplies the random number only when an operation completion signal is received from the operation circuit 11. Furthermore, a clock signal to synchronize with processing is supplied to the operation circuit 11 and the register circuit 14 (not shown in FIG. 1).

Figure 3:
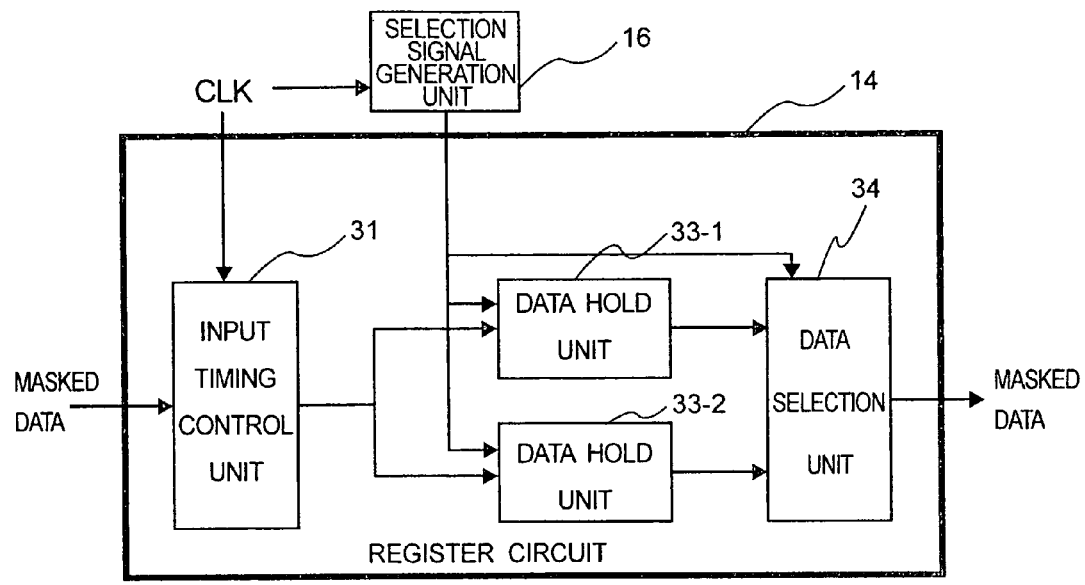
FIG. 3 is a block diagram of a register circuit 14 in FIG. 1.

FIG. 3 is a block diagram of the register circuit 14. The register circuit 14 includes an input timing control unit 31, two data hold units 33-1 and 33-2, and a data selection unit 34. The data hold units 33-1 and 33-2 and the data selection unit 34 are connected to the selection signal generation unit 16. Furthermore, the clock signal is supplied to the input timing control unit 31 and the selection signal generation unit 16.

The selection signal generation unit 16 (located outside of the register circuit 14) outputs a selection signal indicating one of the data hold units 33-1 and 33-2 in synchronization with the clock signal.

Figure 4:
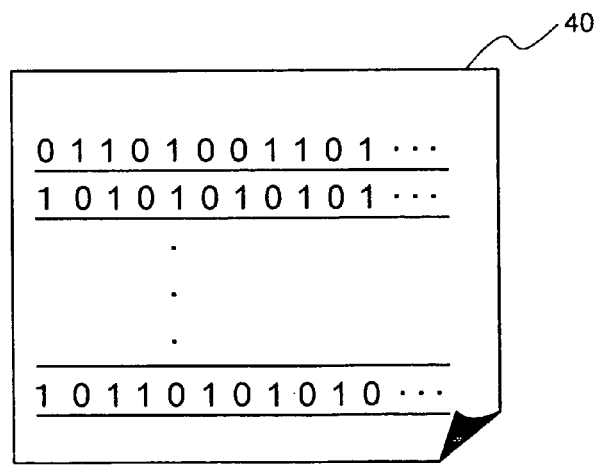
FIG. 4 is a schematic diagram of a table 40 storing a plurality of selection patterns.

As a method for generating the selection signal, for example, a table 40 storing a plurality of selection patterns (each binary line) is prepared as shown in FIG. 4. One selection pattern is selected from the table 40, and a selection signal corresponding to the binary of the one selection pattern is orderly generated in synchronization with the clock signal (For example, "0"→the data hold unit 33-1, "1"→the data hold unit 33-2). Furthermore, by preparing a random number generator of one bit, a selection signal corresponding to a random number "0/1" may be orderly generated in synchronization with the clock signal.

The input timing control unit 31 controls timing to supply masked data (from the operation circuit 11) to the data hold unit 33-1 or 33-2. This timing is based on the clock signal.

Based on the selection signal from the selection signal generation unit 16, masked data from the operation circuit 11 is written and held in one of the data hold units 33-1 and 33-2. Briefly, one of the data hold units 33-1 and 33-2 is updated, and the other of the data hold units 33-1 and 33-2 holds previous data. In this case, the selection signal is synchronized with the clock signal. Accordingly, timing to update the masked data is also synchronized with the clock signal.

Figure 5:
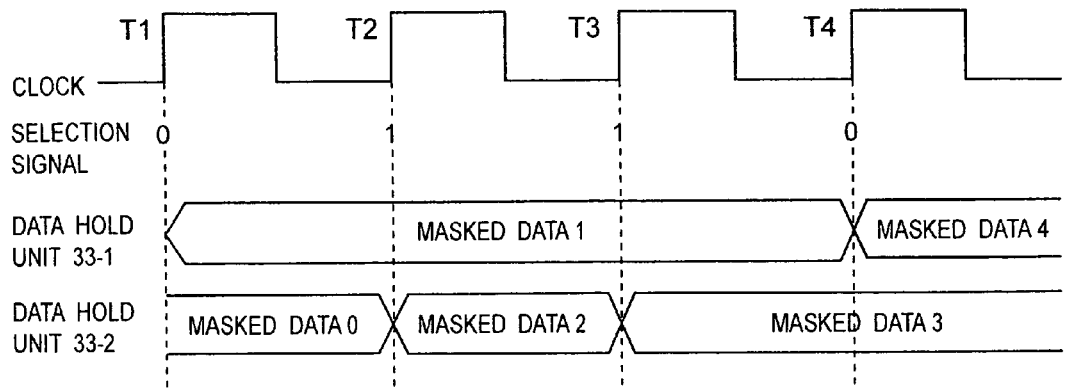
FIG. 5 is a time chart among a selection signal of a selection signal generation unit 16 and masked data stored in data hold units 33-1 and 33-2.

FIG. 5 shows one example of a relationship among the selection signal of the selection signal generation unit 16, and contents held in the data hold units 33-1 and 33-2. In case of the selection signal "0", the data hold unit 33-1 is selected. In case of the selection signal "1", the data hold unit 33-2 is selected.

If the selection signal is "0" (representing the data hold unit 33-1) at timing T1, Masked Data 1 as an operation result from the operation circuit 11 is held in the data hold unit 33-1. On the other hand, the data hold unit 33-2 continually holds Masked Data 0. The Masked Data 0 is a previous operation result from the operation circuit 11.

Next, if the selection signal is "1" (representing the data hold unit 33-2) at timing T2, Masked Data 2 as next operation result from the operation circuit 11 is held in the data hold unit 33-2. On the other hand, the data hold unit 33-1 continually holds Masked Data 1 (already held at timing T1).

Next, if the selection signal is "1" (representing the data hold unit 33-2) at timing T3, Masked Data 3 as two next operation result from the operation circuit 11 is held in the data hold unit 33-2. On the other hand, the data hold unit 33-1 continually holds Masked Data 1 (already held at timing T1).

Next, if the selection signal is "0" (representing the data hold unit 33-1) at timing T4, Masked Data 4 as three next operation result from the operation circuit 11 is held in the data hold unit 33-1. On the other hand, the data hold unit 33-2 continually holds Masked Data 3 (already held at timing T3).

The above example shows a method for continually writing masked data to the same data hold unit. In this case, if a DPA attack is executed against the data hold unit in which masked data is continually written, mask is offset and difference between previous data and current data is found. As a result, secret information is known and security is not apparently maintained. However, if continuous writing of masked data does not occur sequentially, an attacker can not estimate the Hamming distance correctly. Accordingly, the method shown in FIG. 5 has stability against a DPA attack. Furthermore, if masked data is orderly written based on a selection pattern of the second binary line in FIG. 4, masked data is not continually written to the same data hold unit. Accordingly, this method has certainly stability against a DPA attack.

In the above example, as for the data hold unit not selected (masked data is not written), non-processing is executed. However, contents held in the data hold unit not selected may be reset. In this case, "reset" means that "0" or "1" is written to contents of the data hold unit. Furthermore, contents held in the data hold unit not selected may be reversed or replaced with predetermined binary values or a random number. As a result, masked data unnecessary for current operation but reflecting past operation does not remain, and the security of secret information increases.

In FIG. 3, based on the selection signal from the selection signal generation unit 16, the data selection unit 34 selects the latest operation result (of masked data) held in any of the data hold units 33-1 and 33-2, and outputs the latest operation result to the operation unit 11 (or the Exclusive OR circuit 15 at operation completion timing). In this case, the data selection unit 34 selects one data hold unit 33-1 or 33-2 based on the selection signal which was used to select the one data hold unit to write the latest operation result. Accordingly, the latest operation result of masked data can be read from the one data hold unit.

The latest operation result of masked data is recursively supplied to the operation circuit 11 as input data for the next operation. Furthermore, when the operation circuit 11 outputs an operation completion signal to the register circuit 14 (not shown in FIG. 3), the latest operation result of masked data is output to the Exclusive OR circuit 15. The Exclusive OR circuit 15 operates Exclusive OR between the latest operation result of masked data and the same random number (from the random number supply unit 12), and outputs cipher text/plain text data (final output) to the outside.

Figure 6:
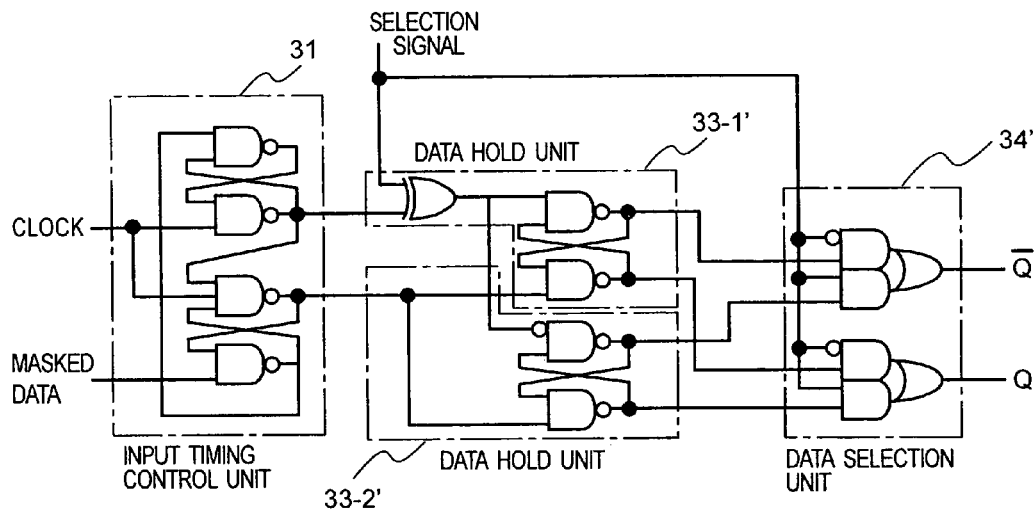
FIG. 6 is a block diagram of one bit register circuit in which a plurality of logical circuits is combined.

For example, as shown in FIG. 6, by aligning "n" units of one bit-register circuit in parallel (combined by logical elements), the register circuit 14 of "n" bits can be composed. In FIG. 6, two outputs of one bit register circuit are shown. In this case, one bit value actually output from any of the two outputs is used as the output value.

As mentioned-above, in the present embodiment, in case of encryption/decryption by repeating the same operation, each operation result of masked data is selectively written to any of two data hold units. Accordingly, the random number need not be changed at operation timing of the operation circuit 11. As a result, scale of the random number generation unit 21 can be miniaturized. In other words, if the random number generation unit is miniaturized only, stability for DPA attack lacks because the random number generation unit constantly generates the same random number. However, in the present embodiment, by preparing two data hold units, each operation result of masked data is selectively written into any of two data hold units. As a result, lacking of stability for DPA attack can be overcome.

Figure 7:
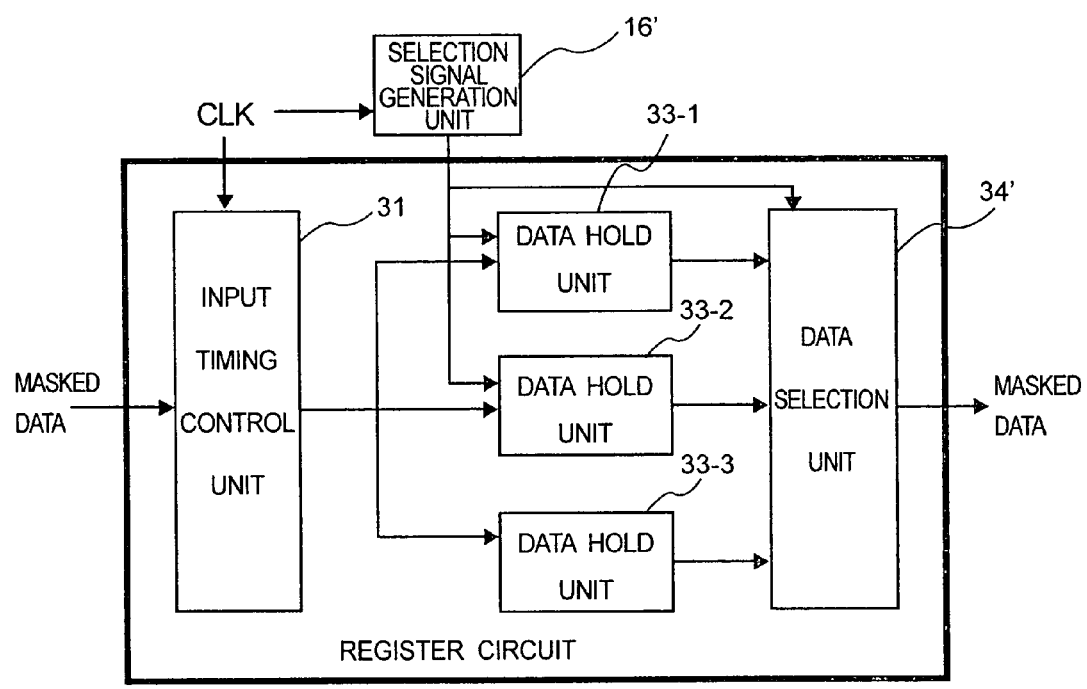
FIG. 7 is another block diagram of the register circuit 14 in FIG. 1.

Next, application example of the present embodiment is explained. In the above embodiment, the register circuit 14 prepares two data hold units. However, the register circuit 14 may prepare a plurality of data hold units equal to or more than three data hold units. FIG. 7 is one application example of the block diagram of the register circuit 14. As shown in FIG. 7, three data hold units 33-1, 33-2, and 33-3 are prepared. In comparison with FIG. 3, different point with the three data hold units is as follows.

(1) The selection signal is changed to select one of the three data hold units.

(2) The data selection unit 34' selects one of masked data stored in the three data hold units based on the selection signal.

As for point (1), in the table of FIG. 4, the selection signal is generated in correspondence with not one bit but two bits. As for point (2), any of three data hold units is selected by three values in four values represented by the two bits. In case of three data hold units, selection of one from three data hold units to write masked data is more complicated than two data hold units. Accordingly, stability against DPA attack increases.

In FIG. 1, the Exclusive OR circuit 13 is located outside of the operation circuit 11. However, the Exclusive OR circuit 13 may be included in the operation circuit 11. In this case, when plain text/cipher text data is input to the operation circuit 11, the plain text/cipher text data is firstly operated with the random number by Exclusive OR. Alternatively, after some preprocessing is executed to the plain text/cipher text data, the plain text/cipher text data may be operated with the random number by Exclusive OR.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

The invention claimed is:

1. An encryption/decryption apparatus comprising:
    a random number supply unit configured to supply a random number;
    a first Exclusive OR circuit configured to perform an Exclusive OR between input data and the random number;
    an operation circuit configured to perform an operation of one of encryption or decryption of output data from the first Exclusive OR circuit;
    a selection signal generation unit configured to repeatedly generate a selection signal in synchronization with output timing of data from the operation circuit;
    a data register circuit having a plurality of data hold units, the data register circuit configured to hold data from the operation circuit in one data hold unit in response to the selection signal, the selection signal selectively indicating the one data hold unit from among the plurality of data hold units, the data register circuit further configured to supply the data from the one data hold unit to the operation circuit; and
    a second Exclusive OR circuit configured to perform an Exclusive OR between the data supplied from the data register circuit and the random number;
    wherein the operation circuit is further configured to recursively perform the one operation on the data supplied from the data register circuit and to output operated data to the data register circuit.

2. The encryption/decryption apparatus according to claim 1, wherein the plurality of data hold units is two data hold units.

3. The encryption/decryption apparatus according to claim 1, wherein the plurality of data hold units is equal to or more than three data hold units.

4. The encryption/decryption apparatus according to claim 1, wherein the random number supply unit includes a random number generator configured to repeatedly generate a random number of which length is shorter than the input data, and a random number hold unit configured to connect a plurality of random numbers from the random number generator and to fixedly hold the random number of which length is equal to the input data.

5. The encryption/decryption apparatus according to claim 1, wherein the operation circuit executes operation processing of the output data from the first Exclusive OR circuit at the first operation time, and executes the operation processing of previous operated data from the second operation time.

6. The encryption/decryption apparatus according to claim 5, wherein the random number supply unit fixedly supplies the random number before the first operation time.

7. The encryption/decryption apparatus according to claim 1, wherein the first Exclusive OR circuit is included in the operation circuit.

8. The encryption/decryption apparatus according to claim 1, wherein the data register circuit holds the data in one data hold unit selected by the selection signal whenever the data is input from the operation circuit.

9. The encryption/decryption apparatus according to claim 8, wherein the data register circuit recursively supplies the data from the one data hold unit to the operation circuit at each operation time while an operation completion signal from the operation circuit is not received.

10. The encryption/decryption apparatus according to claim 9, wherein the data register circuit outputs the data from the one data hold unit to the second Exclusive OR circuit in response to the operation complete signal.

11. The encryption/decryption apparatus according to claim 10, wherein the second Exclusive OR circuit outputs an operation result of Exclusive OR between the data and the random number to the outside.

12. The encryption/decryption apparatus according to claim 1, wherein if the input text data is plain text data, the operation circuit operates encryption of the plain text data and outputs cipher text data as an encryption result.

13. The encryption/decryption apparatus according to claim 1, wherein if the input text data is cipher text data, the operation circuit operates decryption of the cipher text data and outputs plain text data as a decryption result.

14. The encryption/decryption apparatus according to claim 1, wherein the selection signal does not continually indicate the same data hold unit in the plurality of data hold units.

15. The encryption/decryption apparatus according to claim 1, wherein the data register circuit resets contents of another data hold unit not selected by the selection signal in the plurality of data hold units.

16. The encryption/decryption apparatus according to claim 1, wherein the data register circuit reverses contents of another data hold unit not selected by the selection signal in the plurality of data hold units.

17. The encryption/decryption apparatus according to claim 1, wherein the data register circuit rewrites contents of another data hold unit not selected by the selection signal with predetermined binary data or a random number.

18. The encryption/decryption apparatus of claim 1, wherein the one data hold unit is a first data hold unit and the selection signal is a first selection signal, and wherein the data register circuit is further configured to:
    receive the operated data from the operation circuit after the operation unit recursively performs the operation; and
    store the operated data in a second data hold unit of the plurality of data hold units in accordance with a second selection signal,
    wherein a first indicator and a second indicator from a predefined selection pattern of indicators are selected in-order, to generate the first selection signal and the second selection signal, and wherein the first indicator and the second indicator indicate the first data hold unit and the second data hold unit.

19. A method for performing encryption/decryption comprising the steps of:
    identifying a random number;
    performing an Exclusive OR operation between input data and the random number;

performing, at an operation circuit, an operation of one of encryption or decryption of output data from the Exclusive OR operation;

identifying a selection signal in synchronization with output timing of data from the operation circuit;

in response to the selection signal, holding data from the operation circuit in one data hold unit of a plurality of data hold units of a data register circuit, the selection signal selectively indicating the one data hold unit from among the plurality of data hold units;

supplying the data from the one data hold unit to the operation circuit;

recursively performing, at the operation circuit, the operation on the data supplied from the one data hold unit; and output operated data from the operation circuit to the data register circuit.

* * * * *